Aug. 5, 1958
R. D. TORREY
2,846,670
SCALE OF N COUNTER
Filed March 29, 1955
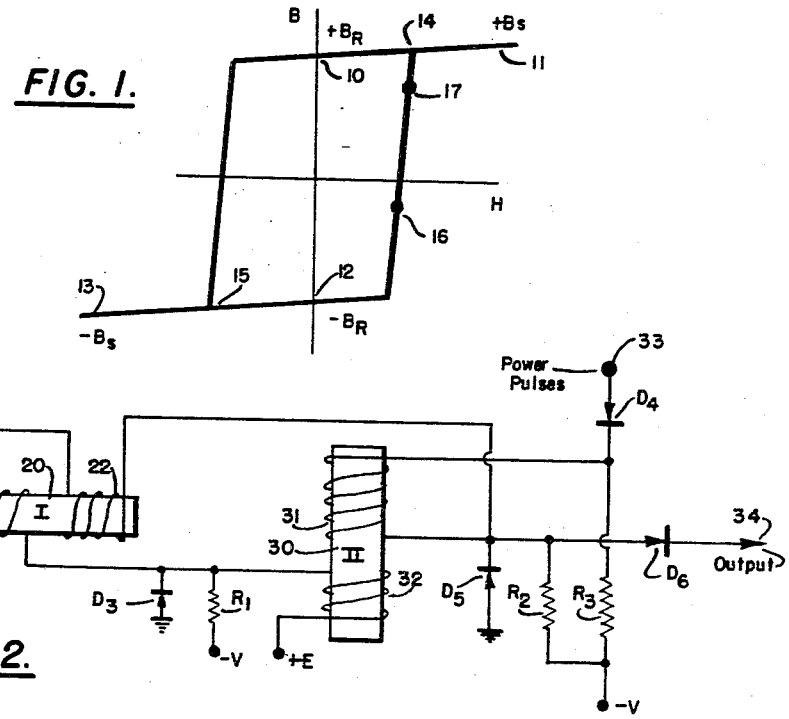
FIG. 1.
FIG. 2.
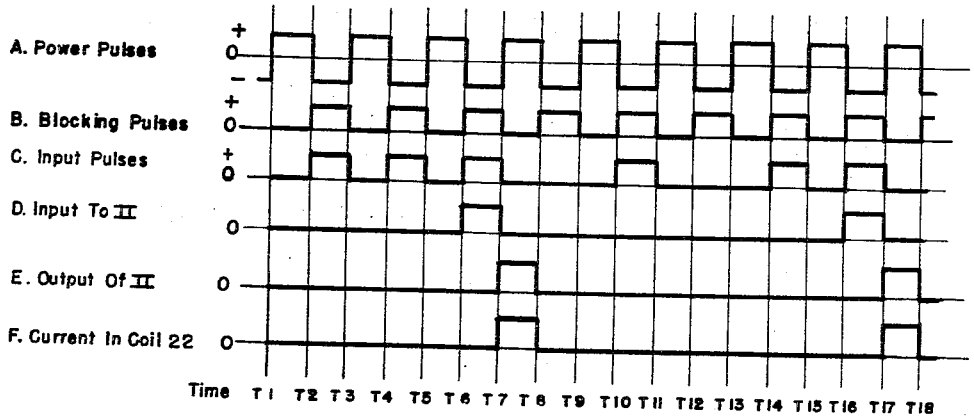
FIG. 3.
INVENTOR
ROBERT D. TORREY
BY Charles C. English
AGENT

United States Patent Office 2,846,670
Patented Aug. 5, 1958

2,846,670

SCALE OF N COUNTER

Robert D. Torrey, Philadelphia, Pa., assignor, by mesne assignments, to Sperry Rand Corporation, New York, N. Y., a corporation of Delaware Application March 29, 1955, Serial No. 497,719

14 Claims. (Cl. 340—174)

The present invention relates to control devices for use in pulse type systems, and is more particularly concerned with counters, and with frequency dividers, for use in such systems.

As is well known, various electronic applications often require control systems capable of producing an output pulse in response to the application of a predetermined number of input pulses. Such systems are utilized in frequency dividing applications, and are also employed as counter devices. If the system employed is responsive to a predetermined succession of N input pulses for producing a significant output pulse, the device is termed a "scale of N counter," and it is with such devices that the present invention is primarily concerned.

In the past, scale of N counters, or frequency dividers, have normally been constructed of vacuum tube circuitry, and while such circuits have in general performed with acceptable results, the vacuum tube construction employed has been subject to several disadvantages. Thus, such vacuum tube circuits are of relatively large size, making disposition of components rather difficult. Again, vacuum tube circuits are subject to breakage and, as a result, make for a relatively fragile system; and in addition, such circuits are subject to operating failures, thus raising serious questions of maintenance and of the cost attendant thereto.

In an attempt to obviate certain of the foregoing disadvantages, other forms of circuitry have been suggested for use in counter or frequency dividing applications, and one such other form has been based upon the use of magnetic devices. The present invention falls particularly within this latter category.

It is accordingly an object of the present invention to provide a novel counter device utilizing magnetic circuits.

Still another object of the present invention resides in the provision of a novel control device for use in counting applications, which device is both inexpensive to construct and which exhibits considerable ruggedness.

A still further object of the present invention resides in the provision of a counter device which can be made in relatively small sizes.

A further object of the present invention is the provision of a magnetic control circuit selectively responsive to a predetermined succession of input pulses for effecting a characteristic output pulse.

Another object of the present invention resides in the provision of a magnetic control device utilizing a magnetic amplifier in conjunction with a pulse responsive variable impedance for selectively coupling pulse inputs to the said amplifier.

In accordance with the foregoing objects, the present invention comprises a magnetic circuit arrangement selectively responsive to a succession of input pulses for producing output pulses representing a predetermined sub-multiple of the said succession of said input pulses. The device thus finds particular utility in counting or in frequency division, applications. In effecting the objects given above, a variable impedance is employed having, preferably, two distinct impedance states, one of which is of a relatively low magnitude and the other of which is of a relatively high magnitude. The said impedance is further responsive to the succession of a predetermined number of input pulses for changing from its said high impedance state to its said low impedance state, thereby to permit the passage of a pulse through the said impedance to an output system (preferably including an amplifier).

The variable impedance, in accordance with a preferred embodiment of the present invention, may comprise a core of selectively saturable magnetic material having a winding thereon, and a predetermined plurality of input pulses coupled to said winding may be required to change said core from a substantially unsaturated condition to a substantially saturated condition. When such a magnetic variable impedance is employed, means are also provided for causing the core utilized to revert from the said saturated to the said unsaturated condition, subsequent to the passage of a pulse through the pertinent circuit portion. The pulse thus passing through the variable impedance (e. g. via a winding on the said selectively saturable core), is preferably coupled to an amplifier, and this amplifier may also comprise a magnetic device, for instance of the non-complementing pulse type. In this respect, and as will be described subsequently, a non-complementing amplifier is defined as one producing an output pulse only in response to an input thereto; or on the contrary, one which will produce no output in the absence of an input thereto. By the arrangement described, therefore, a source of pulses to be counted may be coupled to a selectively variable impedance, whereby the said impedance normally blocks the passage of said pulses to an amplifier or other output system employed. After a predetermined succession of input pulses has been applied to the impedance, the said impedance is caused to assume a relatively low magnitude, whereupon a pulse may then pass from the said source of pulses to be counted to the output system. Means are also provided for then reverting the impedance to its original relatively high magnitude, until a further succession of the said predetermined number of pulses have been received.

The foregoing objects, advantages, construction and operation of the present invention will become more readily apparent from the following description and accompanying drawings, in which:

Figure 1 is an idealized hysteresis loop of a magnetic material such as may be employed in some or all of the magnetic portions of the present invention.

Figure 2 is a schematic diagram of a control circuit in accordance with the present invention and capable of operating as a scale of N counter; and Figure 3 (A through F) are waveforms illustrating the operation of the circuit shown in Figure 2.

Referring now to Figure 1, it will be seen that the magnetic circuits, such as may be employed in the present invention, preferably, but not necessarily, utilize magnetic cores exhibiting a substantially rectangular hysteresis loop. Such cores may be made of a variety of materials, among which are various types of ferrites, and various kinds of magnetic tapes, including Orthonik and 4-79 Molypermalloy. These materials may have different heat treatments to give them different desired properties. In addition to the wide variety of materials applicable, the magnetic elements to be discussed may be constructed in a number of different geometries, including both closed and open core paths. For example, cup-shaped cores, strips of material, or toroidal cores are possible. It must be emphasized, however, that the present invention is not limited to any specific geometries of its cores nor to any specific materials therefor, and neither the precise core configuration nor core material to be discussed is mandatory. The examples to be given are in fact illustrative only and many variations will readily suggest themselves to those skilled in the art.

Returning now to the hysteresis loop shown in Figure 1, it will be noted that the curve exhibits several significant points of operation, namely, point 10 (+Br) which represents a point of plus remanence; the point 11 (+Bs) which represents a point of plus saturation; the point 12 (—Br) which represents minus remanence; the point 13 (—Bs) which represents minus saturation; the point 14 which represents the beginning of the plus saturation region; and the point 15 which represents the beginning of the minus saturation region.

Discussing for the moment the operation of a device utilizing a core which exhibits a hysteresis loop such as has been shown in Figure 1, let us assume that a coil is mounted or wound on the said core. If we should initially assume that the core is at its +Br operating point 10, and if a current should be passed through the said coil on the said core in a direction tending to produce a magnetizing force in a direction of +H, that is in a direction tending to increase the flux in the said core, the core will be driven from its +Br operating point 10 to its +Bs operating point 11. During this state of operation there is relatively little flux change in the said core and the coil therefore presents a relatively low impedance, whereby energy fed to the said coil during this state of operation will pass readily therethrough and may be utilized to effect a usable output.

On the other hand, if the core should initially be at its —Br operating point 12 prior to the application of a +H pulse, upon application of such a pulse the core will tend to be driven from the said operating point 12 toward the region of plus saturation. During this particular state of operation, and prior to actual saturation of the core, there is a relatively large flux change in the said core, whereby the coil presents a relatively high impedance to the applied pulse. As a result, substantially all of the energy applied to the coil when the core is initially at its —Br operating point 12 will be expended in moving the core from the said operating point 12 toward the region of plus saturation, with very little of this energy actually passing through the said coil to give a usable output.

Summarizing the foregoing, it will be seen that the substantially horizontal portions of the hysteresis loop shown in Figure 1, representing relatively saturated operation, correspond to relatively low impedance states for a coil carried by the said core; while the substantially vertical portions of the hysteresis loop, representing unsaturated portions of the core operation, correspond to relatively high impedance conditions for the said coil. Therefore, depending upon whether the core is initially at its +Br operating point 10 or at its —Br operating point 12, an applied pulse in the +H direction will be presented respectively with either a low impedance or a high impedance, and will effect either a relatively large output or a relatively small output. These considerations are of value in the construction of a magnetic control circuit, such as is utilized in the present invention.

Referring now to Figure 2, and making reference to the waveform diagrams of Figure 3, it will be seen that a counting device, in accordance with the present invention, may comprise two basic circuit portions, identified by I and II. The section I acts as a selectively variable impedance, and may comprise a core 20 of magnetic material, which may preferably, but not necessarily, utilize materials of the type discussed in reference to Figure 1; and the said core 20 carries a first winding 21 coupled at one of its ends via a rectifier D1 to a source 23 of successive input pulses. The other end of winding 21 is coupled to the input of section II of the circuit, which may comprise an amplifier, and in one arrangement of the present invention this amplifier may in fact take the form of a non-complementing magnetic amplifier, the structure and operation of which will be described. The core 20 further carries a winding 22 thereon, coupled at one of its ends via a rectifier D2 to a source 24 of blocking and reset pulses, and coupled at the other of its ends to the output terminal of the non-complementing amplifier of section II. The function of the winding 22 and its associated pulse sources will become apparent from the subsequent description; and, in essence, these components act to selectively reset the core 20 from a relatively saturated condition to a relatively unsaturated condition during desired portions of the operating cycle.

In the particular example shown in Figure 2, the section II of the control device comprises a non-complementing magnetic amplifier, and such an amplifier may utilize a magnetic core 30, again preferably, but not necessarily, exhibiting a hysteresis loop similar to that discussed in reference to Figure 1. The core 30 carries two windings thereon, namely, a power or output winding 31 and a signal or input winding 32. One end of the said power winding 31 is coupled via the said rectifier D4, poled as shown, to the source 33 of positive and negative-going power pulses, and such pulses have been illustrated in Figure 3A. For purposes of the following discussion, the power pulses are assumed to have a center value of zero volts, and to exhibit excursions between plus and minus V volts.

Discussing for the moment the operation of a magnetic amplifier of the type shown, let us initially assume that the core 30 is at its —Br operating point 12. If now during a time interval $t3$ to $t4$ for instance, a positive-going power pulse (Figure 3A) should be applied from the source 33, this power pulse will cause a current to flow via the rectifier D4 to winding 31 and thence through rectifier D6 to an output point 34. Inasmuch as the energy of this pulse is for the most part expended in flipping the core 30 from its —Br operating point 12 to its +Br operating point 10, only a very small output at best will appear at the output point 34.

It should be noted that in a preferred embodiment of the present invention, the magnitude of power pulses applied should be such that the core 30 is driven only to the region of the operating point 14, thus minimizing the said small output appearing at terminal 34. This small output is termed a sneak output and is effectively suppressed by the combination of resistor R2 and rectifier D5 connected as shown, this suppression being effected by so choosing the magnitude of resistor R2 that a current normally flows from ground through the rectifier D5 and thence through the resistor R2 to a source of negative potential —V, which current is equal to or greater than that of the sneak pulse current to be suppressed. The arrangement of rectifier D5 and resistor R2 therefore functions as a clamp, and only outputs substantially larger than that of the sneak output may appear at the said output terminal 34.

Summarizing the foregoing therefore, during the time interval $t3$ to $t4$ for instance, the applied positive-going power pulse merely succeeds in flipping the core 30 from its —Br operating point to its +Br operating point, and due to the sneak suppression by rectifier D5 and resistor R2, no output will appear at terminal 34. During the next succeeding time interval, for instance the interval $t4$ to $t5$, a negative-going power pulse is applied from the source 33 and this applied pulse effectively causes rectifier D4 to cut off. During this particular period of time, a reverse current flows from ground through the rectifier D5, through the said winding 31 and thence through resistor R3 to the source of negative potential —V. The value of this reverse current flow is substantially $$\frac{V}{R3}$$

and the magnitude of R3 is in turn so chosen that the current flow in the reverse direction through output winding 31 is sufficient to flip the core 30, during the period t4 to t5 for instance, from its +Br operating point 10 to the operating point 15 and thence to the —Br operating point 12. At time t5, therefore, the core once more finds itself at its —Br operating point, and a further positive-going power pulse applied from the source 33 during the time interval t5 to t6 will again merely flip the core 30 to its plus remanence region without effecting any output. Thus, in the absence of any other input signals, the core 30 is regularly flipped between its —Br and +Br operating points, without there being any significant output at the terminal 34.

If we should now assume that an input pulse (Figure 3D) should be applied to one end of the input winding 32, for instance during the time interval t6 to t7, this input pulse will effect a current flow through the signal winding 32 and will subject the core 30 to a magnetizing force in opposition to that produced by the reverse current flow through output winding 31 during this same time interval. This opposing magnetizing force results, as will become apparent from a consideration of the winding directions shown in Figure 2, inasmuch as the signal or input coil 32 is wound in the same direction as that of output coil 31 on the said core 30. The magnetizing effect of the reverse current flow through winding 31, during the time interval t6 to t7, is thus effectively nullified and, therefore, at the time t7 the core will still be at its +Br operating point 10. The application of a further positive-going power pulse from the source 33, during the time interval t7 to t8, will therefore cause a substantial output to appear at the output terminal 34 (Figure 3E). If no further input pulse should be applied during the time interval t8 to t9, the reverse current flow through output winding 31, during this particular time interval, will once more cause the core 30 to revert to its minus remanence operating point 12, whereby no output will appear from the amplifier during the time interval t9 to t10, etc. Thus, the arrangement of amplifier section II is such that an output will appear at terminal 34 during the application of a positive-going power pulse only if an input had been coupled to the input winding 32 during the next preceding negative-going power pulse; and the device therefore acts as a non-complementing pulse type magnetic amplifier.

One further design consideration should be noted. Current flow through the winding 31 will, in the absence of other circumstances, establish flux changes tending to induce voltages in the signal or input coil 32. In order to prevent the input circuit coupled to the said coil 32 from any interference due to current flowing in the power winding 31, the said signal winding 32 is returned to a positive voltage +E, as shown, which positive voltage is equal and opposite in magnitude to the voltage induced or generated in the said winding 32 by current flowing in the said reverse direction in the power or output winding 31.

Returning now to the circuit section I, it will be seen that much the same considerations given above also apply. When the core 20 is at its minus remanence operating point 12, input pulses applied from the source 23 via the rectifier D1 will subject the said core 20 to a magnetizing force tending to drive the said core 20 from its minus remanence operating point 12 toward its plus saturation region 11. The material, and physical configuration, of the core 20 is so chosen in respect to the magnitude of input pulses applied from source 23 that a predetermined number (N) of successive input pulses are required to cause the traverse of core 20 from its minus remanence operating condition into its plus saturation condition, and a significant output will pass through the winding 21 only after N such pulses have been received.

In the particular example shown in Figure 1, N has been assumed to be 3 and, in accordance with the preceding discussion, therefore, a first input pulse will cause the core 20 to be driven from its —Br operating point 12 to the region of the operating point 16; a second input pulse will cause the core 20 to be driven from the region of the point 16 to the region of the point 17; and a third input pulse will then tend to drive the core 20 from the region of point 17 to the region of point 11 via the point 14. Thus, when N is 3, three successive pulses are required to change the core 20 from a relatively unsaturated condition, represented by operation at the point 12, to a relatively saturated condition, represented by operation between the point 14 and the point 11. During the application of pulses tending to drive the core 20 along the unsaturated portion of its hysteresis loop, only relatively small outputs will be coupled via the coil 21 to the input winding 32 of amplifier II; and these small outputs are again suppressed by the arrangement of rectifier D3 and resistor R1, in a manner analogous to that described in reference to the sneak suppressor D5—R2. Thus, during operation over the substantially unsaturated portions of its hysteresis loop, the core 20 will cause the coil 21 to exhibit a relatively high impedance, thereby preventing pulses from input source 23 from passing to winding 32 of amplifier II. After a succession of N pulses have appeared from source 23, however, the core 20 will be caused to assume a relatively saturated condition whereby coil 21 exhibits a relatively low impedance, permitting the Nth pulse from source 23 to pass to the input winding 32 of amplifier II and giving thereafter an output pulse at terminal 34 of the said amplifier II in the manner described previously.

The winding 22, carried by core 20, acts to selectively reset the said core 20 to its unsaturated condition, i. e. to operation at its minus remanence operating point 12, subsequent to passage of the said Nth pulse through the winding 21 to the input of amplzer II. One end of the winding 22, as has been described previously, is coupled to the output of amplifier II, while the other end of the said winding 22 is coupled to a source 24 of blocking and reset pulses, the waveform configuration of which is shown in Figure 3B. As will become apparent from a comparison of Figures 3A and 3B, the terminal 24 is substantially at ground potential each time that the source 33 assumes a positive potential. Therefore, current will flow from the output of amplifier II through winding 22 to the point 24 via rectifier D2 each time that a positive output pulse is obtained from amplifier II.

Once the core 20 is caused to assume a saturated condition, in response to the receiving of a succession N pulses from the source 23, it will provide an output from amplifier II that will cause a substantial current to flow through the said winding 22 to the point 24 (which is then at ground potential), and inasmuch as the winding 22 is of a polarity opposite to that of winding 21, the said current flow through winding 22 will cause core 20 to revert to its minus remanence operating point 12 until a further succession of N input pulses has been applied from the source 23. The blocking and reset pulses applied from source 24 serve a further function in that these pulses are positive in polarity, tending to cut off the rectifier D2, each time that an input pulse is applied from the source 23 via rectifier D1 to the winding 21. The blocking and reset pulses thus prevent current from flowing in the winding 22 whenever input pulses are applied from source 23, thus overcoming any interaction between the two windings on core 20; and as described previously, the said blocking pulses applied at source 24 in fact permit current flow through winding 22 only in intervals intermediate the application of input pulses from source 23.

One operating sequence, in accordance with the preceding discussion, has been shown in the waveforms of Figure 3, and in this respect it has been assumed that N equals 3. Examining Figure 3, therefore, it will be noted that during the time intervals *t*2 to *t*3, *t*4 to *t*5 and *t*6 to *t*7, input pulses are applied from the source 23 to the winding 21. As was described in reference to Figure 1, the first two of these three input pulses drives the core 20 from its operating point 12 to the region of its operating point 17. The third input pulse appearing during time interval *t*6 to *t*7 (Figure 3C) drives the core 20 into its plus saturation region, permitting a relatively large current to flow through the said winding 21 and effecting an input to the winding 32 of amplifier II (Figure 3D). Amplifier II will therefore provide an output pulse at terminal 34 during the time interval *t*7 to *t*8 (Figure 3E), and inasmuch as the core 20 is now in a saturated condition, the positive-going output pulse, during the time interval *t*7 to *t*8, also will cause a current to flow through the winding 22 and rectifier D2 to the point 24, which is now at substantially ground potential (Figures 3F and 3B). This current flow through winding 22, during the time interval *t*7 to *t*8, is of a magnitude sufficient to drive the core 20 back to its minus remanence operating point 12, thus causing the system to revert to its original state. Three further input pulses have been shown for the time interval *t*10 to *t*17, and this particular disposition of input pulses has been illustrated to emphasize that the operation of the device is not dependent upon the input pulses occurring during successive time intervals, and in fact these input pulses may occur randomly or at widely spaced intervals of time, provided they are individually timed to occur during the application of negative-going power pulses from the source 33. The counter shown is therefore not frequency conscious and, subject to the foregoing phase limitation, the input pulses may occur at random time intervals.

When the counter shown is employed as a subelement of a larger configuration employing many such counters, such as a shifting register, a ring counter, a storage device, etc., the source 24 may be common to each of the stages and may be utilized to provide a reset pulse for causing all such stages to assume an initial zero state. In this respect, therefore, the source or terminal 24 has been termed both a "blocking" and a "reset" pulse source in Figure 2, and it will be seen that each of the variable impedance sections I of the several counters will be caused to assume an initial high impedance state, upon application of a negative-going reset pulse from the source 24.

While I have described a preferred embodiment of the present invention, many variations will readily suggest themselves to those skilled in the art. In particular, the precise magnetic amplifier shown is merely illustrative, and such amplifiers may in fact take a number of different forms which are all within the scope of the present invention. Other forms of amplifiers and other forms of output means may also be utilized in accordance with the present invention. In addition, it must be stressed that N can be any integer, limited only by the accuracy of the incoming pulses and by the shape of the hysteresis curve of the core material utilized. Still further variations will suggest themselves to those skilled in the art, in accordance with the principles discussed above, and these variations are all meant to fall within the scope of my invention as set forth in the appended claims.

Having thus described my invention, I claim:

1. A control circuit comprising a magnetic amplifier having an input and an output, a source of pulses, means selectively coupling said source of pulses to said input, said last-named means including variable impedance means having first and second distinct magnitudes, said impedance means comprising a core of magnetic material having a first coil thereon, one end of said first coil being coupled to said source of pulses and the other end of said first coil being coupled to the input of said magnetic amplifier, the saturation state of said core being changed in response to application of a predetermined number of pulses from said source to said coil for changing the impedance of said first coil from said first to said second magnitude, thereby to pass a predetermined signal from said source of pulses via said first coil to the input of said amplifier, and means for selectively causing said impedance means to change from said second to said first magnitude, said last-named means comprising a second coil carried by said core and having one end thereof coupled to the output of said magnetic amplifier.

2. The control circuit of claim 1 in which said magnetic amplifier comprises a non-complementing pulse type amplifier.

3. The control circuit of claim 2 in which said magnetic amplifier includes a core of magnetic material exhibiting a substantially rectangular hysteresis loop.

4. A counter circuit comprising an amplifier producing an output in response to an input thereto, a source of input pulses to be counted, variable impedance means coupling said source of pulses to the input of said amplifier, said impedance means comprising a core of magnetic material having a coil thereon, one end of said coil being coupled to said source and the other end of said coil being coupled to the input of said amplifier, potential clamp means coupled to said other end of said coil for normally maintaining said other end of said coil and the input of said amplifier at a predetermined potential, the saturation state of said core being changed in response to applications of a predetermined number of pulses from said source to said coil for changing the impedance of said coil from a high impedance value to a low impedance value, whereby a pulse from said source passes via said coil when the impedance of said coil changes to said low value thereby to change the input potential of said amplifier from said clamped predetermined potential.

5. The counter circuit of claim 4 wherein said amplifier comprises a magnetic amplifier, a source of regularly occurring power pulses coupled to said amplifier for energizing said amplifier, a second coil on said core, and means for selectively causing said core to revert to its original saturation state comprising means selectively coupling a pulse from said source of power pulses via said magnetic amplifier to said second coil.

6. The counter circuit of claim 4 including a second coil on said core for selectively reverting said core to its original saturation state, a source of regularly occurring blocking pulses coupled to one end of said second coil, the other end of said second coil being coupled to the output of said magnetic amplifier.

7. A scale of N counter comprising an amplifier having an input, a source of pulses to be counted, a selectively saturable magnetic circuit coupling said source of pulses to said amplifier input, said magnetic circuit comprising a core of magnetic material exhibiting a substantially rectangular hysteresis loop and having a coil thereon, one end of said coil being connected to said source and the other end of said coil being connected to the input of said amplifier whereby said magnetic circuit is responsive to a succession of N pulses applied to said coil from said source for changing said core from an unsaturated to a saturated condition, thereby to pass every Nth pulse from said source of pulses via said coil to said amplifier input, and reverting means responsive to an output from said amplifier for changing said core to an unsaturated condition subsequent to the passing of a pulse via said coil to said amplifier input.

8. The counter of claim 7 in which said reverting means includes a further coil on said core, and means passing a current through said further coil after said core has been changed to said saturated condition, said last-named means comprising a source of variable potential coupled to one end of said further coil, a rectifier in series with said further coil and source of variable potential, the other end of said further coil being connected to the output of said amplifier.

9. The counter of claim 7 in which said amplifier comprises a non-complementing magnetic amplifier having a further core of magnetic material exhibiting a substantially rectangular hysteresis loop.

10. A counter circuit comprising a source of pulses to be counted, a core of selectively saturable magnetic material exhibiting a substantially rectangular hysteresis loop, said core being responsive to a predetermined plurality N of pulses from said source for causing said core to change from a substantially unsaturated to a substantially saturated condition, a coil carried by said core and having one end thereof coupled to said source, output means coupled to the other end of said coil, whereby every Nth pulse from said source passes through said coil to said output means when said core assumes a saturated condition, and magnetomotive force means coupled to said core and responsive to passage of a pulse through said coil for causing said core to revert a substantially unsaturated condition subsequent to the passage of said pulse through said coil to said output means.

11. The counter circuit of claim 10 wherein said magnetomotive force means comprises a further winding carried by said core, and a further source of pulses coupled to said further winding.

12. A pulse responsive control circuit comprising a core of magnetic material exhibiting a substantially rectangular hysteresis loop and having first and second windings thereon, a source of input pulses coupled to one end of said first winding, an amplifier having its input coupled to the other end of said first winding, said core being responsive to successive occurrence of a predetermined plurality of said input pulses for assuming a substantially saturated condition whereby a pulse from said source of input pulses will pass via said first winding to said amplifier input only after said predetermined plurality of input pulses has been coupled to said first winding, one end of said second winding being coupled to the output of said amplifier and a source of spaced blocking pulses coupled via rectifier means to the other end of said second winding whereby said core is caused to revert from said substantially saturated condition to a substantially unsaturated condition in response to occurrence of an output signal from said amplifier in coincidence with a predetermined potential excursion of said blocking pulse source.

13. The control circuit of claim 12 wherein said amplifier comprises a pulse-type magnetic amplifier including a further core of magnetic material exhibiting a substantially rectangular hysteresis loop.

14. The combination of claim 12 including potential clamp means coupled to said other end of said first winding for normally maintaining said amplifier input at a predetermined reference potential whereby said amplifier produces no output signal in the absence of a pulse applied to said amplifier input from said source of input pulses via said first winding.

References Cited in the file of this patent

UNITED STATES PATENTS

| 2,731,203 | Miles | Jan. 17, 1956 |
| 2,777,098 | Duffing et al. | Jan. 8, 1957 |

OTHER REFERENCES

Journal of Applied Physics, vol. 22, January 1951, pp. 107 and 108, article entitled "A Magnetic Scaling Circuit" by H. Hertz.